US010304012B2

(12) United States Patent
Ifrach et al.

(10) Patent No.: US 10,304,012 B2
(45) Date of Patent: May 28, 2019

(54) DETERMINING HOST PREFERENCES FOR ACCOMMODATION LISTINGS

(71) Applicant: Airbnb, Inc., San Francisco, CA (US)

(72) Inventors: Bar Ifrach, San Francisco, CA (US); Spencer de Mars, San Francisco, CA (US); Maxim Charkov, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 743 days.

(21) Appl. No.: 14/505,455

(22) Filed: Oct. 2, 2014

(65) Prior Publication Data
US 2016/0098649 A1 Apr. 7, 2016

(51) Int. Cl.
  *G06F 17/18* (2006.01)
  *G06Q 10/02* (2012.01)
  *G06Q 50/12* (2012.01)
  *G06Q 50/14* (2012.01)
  *G06Q 50/16* (2012.01)

(52) U.S. Cl.
  CPC ............. *G06Q 10/02* (2013.01); *G06F 17/18* (2013.01); *G06Q 50/12* (2013.01); *G06Q 50/14* (2013.01); *G06Q 50/163* (2013.01)

(58) Field of Classification Search
  CPC ................................ G06Q 10/02; G06F 17/18
  USPC .......................................................... 705/5
  See application file for complete search history.

(56) References Cited

U.S. PATENT DOCUMENTS

| 9,020,936 | B2* | 4/2015 | Svore | G06F 17/30864 707/723 |
| 2003/0220773 | A1* | 11/2003 | Haas | G06Q 10/0637 703/2 |
| 2010/0198628 | A1* | 8/2010 | Rayner | G06Q 10/025 705/6 |
| 2010/0262440 | A1* | 10/2010 | Ulring | G06Q 10/02 705/5 |
| 2011/0106583 | A1* | 5/2011 | Rozell | G06Q 10/02 705/7.29 |
| 2013/0031506 | A1* | 1/2013 | Diaz | G06Q 50/12 715/781 |
| 2014/0156183 | A1* | 6/2014 | Windeler | G08G 1/144 701/454 |

(Continued)

OTHER PUBLICATIONS

Online Price Competition within and between Heterogeneous Retailer Groups (Year: 2004).*

(Continued)

*Primary Examiner* — Brian M Epstein
*Assistant Examiner* — Zeina Elchanti
(74) *Attorney, Agent, or Firm* — Fenwick & West LLP

(57) ABSTRACT

Methods and systems for determining the preferences of hosts offering accommodations are disclosed. In one embodiment, an online booking system models the preferences of hosts based on statistical relationships between features of previously received accommodation reservation requests and the acceptance of those reservation requests by the hosts. In particular, the system classifies reservation requests based on several features—a reservation request either possesses a feature or does not possess a feature. The preference of a host for a particular request feature is modeled based on the relationship between the reservation requests that possess the feature and the reservation requests that are accepted by the host.

35 Claims, 7 Drawing Sheets

(56) References Cited

U.S. PATENT DOCUMENTS

2014/0278591 A1* 9/2014 Blecharczyk .......... G06Q 10/02
705/5
2017/0116548 A1* 4/2017 Ito ........................ G06Q 10/02

OTHER PUBLICATIONS

PCT International Search Report and Written Opinion, PCT Application No. PCT/US2015/039218, dated Sep. 7, 2015, 11 pages.
Canadian First Office Action, Canadian Application No. 2,963,082, dated Feb. 15, 2018, 5 pages.

* cited by examiner

DETERMINING HOST PREFERENCES FOR ACCOMMODATION LISTINGS

TECHNICAL FIELD

This invention relates to accommodation booking systems and in particular to determining host preferences when accepting reservation requests for an accommodation listing.

BACKGROUND

Online booking systems match guests looking for short term accommodation with hosts offering accommodations. Hosts typically have certain preferences that impact whether a particular request for an accommodation is accepted or rejected by them. Such preferences may be explicitly provided by the hosts, such as an indication that no pets are allowed, or that the accommodation is only available on weekends. Most often, however, the preferences are implicit and dependent upon several variables that are not easily quantifiable. Therefore, it can be difficult to determine whether a particular request for a reservation will be accepted or rejected

SUMMARY

An online booking system models the preferences of hosts based on statistical relationships between features of previously received reservation requests and the acceptance of those reservation requests by the hosts. In particular, the system classifies reservation requests based on a set of features. The preference of a host for a particular request feature is modeled based on the relationship between the reservation requests that possess the feature and the reservation requests that are accepted by the host. The system uses the preference model for a given listing to determine a probability that a prospective reservation request for the listing will be accepted by the host. The probability may be used to generate accurate search results by lowering the presentation rank of or filtering out search results where the prospective reservation request has a low probability of being accepted by the host.

In some cases, sufficient historical data needed to generate an accurate preference model is not available. To address this insufficiency of data, the preference model is generated based on historical data for a given listing in combination with historical data for other listings in the same region.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
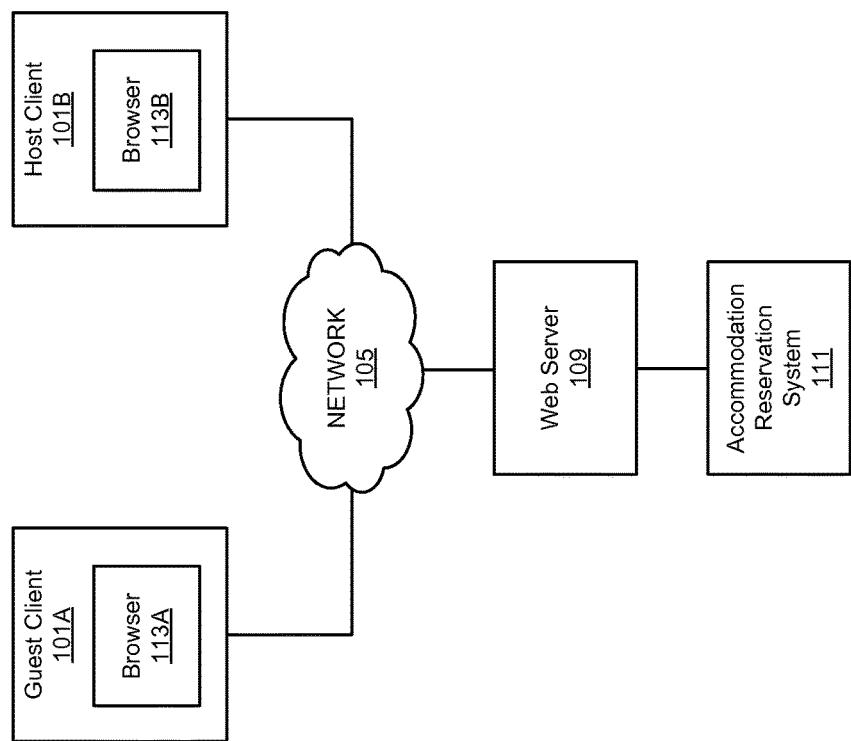
FIG. 1 is a system diagram of the online booking system in accordance with one embodiment.

FIG. 1 is a system diagram of the online booking system in accordance with one embodiment. FIG. 1 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

The network 105 represents the communication pathways between users 103 (e.g., consumers) and the online booking system 111. In one embodiment, the network is the Internet. The network can also utilize dedicated or private communication links (e.g. wide area networks (WANs), metropolitan area networks (MANs), or local area networks (LANs)) that are not necessarily part of the Internet. The network uses standard communications technologies and/or protocols.

The client devices 101 are used by the users 103 for interacting with the online booking system 111. A client device 101 can be any device that is or incorporates a computer such as a personal computer (PC), a desktop computer, a laptop computer, a notebook, a smartphone, or the like. A computer is a device having one or more general or special purpose processors, memory, storage, and networking components (either wired or wireless). The client device 101 executes an operating system, for example, a Microsoft Windows-compatible operating system (OS), Apple OS X or iOS, a Linux distribution, or Google's Android OS. In some embodiments, the client device 101 may use a web browser 113, such as Microsoft Internet Explorer, Mozilla Firefox, Google Chrome, Apple Safari and/or Opera, as an interface to interact with the online booking system 111. In other embodiments, the client device 101 may execute a dedicated application for accessing the online booking system 111.

The online booking system 111 includes web server 109 that presents web pages or other web content that form the basic interface visible to the users 103. Users 103 use respective client devices 101 to access one or more web pages, and provide data to the online booking system 111 via the interface.

The online booking system 111 may be, for example, an online booking system, a dining reservation system, a rideshare reservation system, a retail system, and the like. More generally, the online booking system 111 provides users with access to an inventory of resources (e.g. goods and services) that are available to consumers. The real world, physical location of each resource is considered as a factor in the consumer's decision to consume (e.g., purchase, rent, or otherwise obtain) the resource. Other factors include the listing type, the identity of the listing owner, and reviews of users' who have previously used the service offered by the listing.

In some embodiments, the online booking system 111 facilitates transactions between users 103. For example, an online booking system allows users 103 to book accommodations provided by other users of the online booking system. A rideshare reservation system allows users 103 to book rides from one location to another. An online marketplace system allows users 103 to buy and/or sell goods or services face to face with other users. The online booking system 111 comprises additional components and modules that are described below.

Online Booking System

Figure 2:
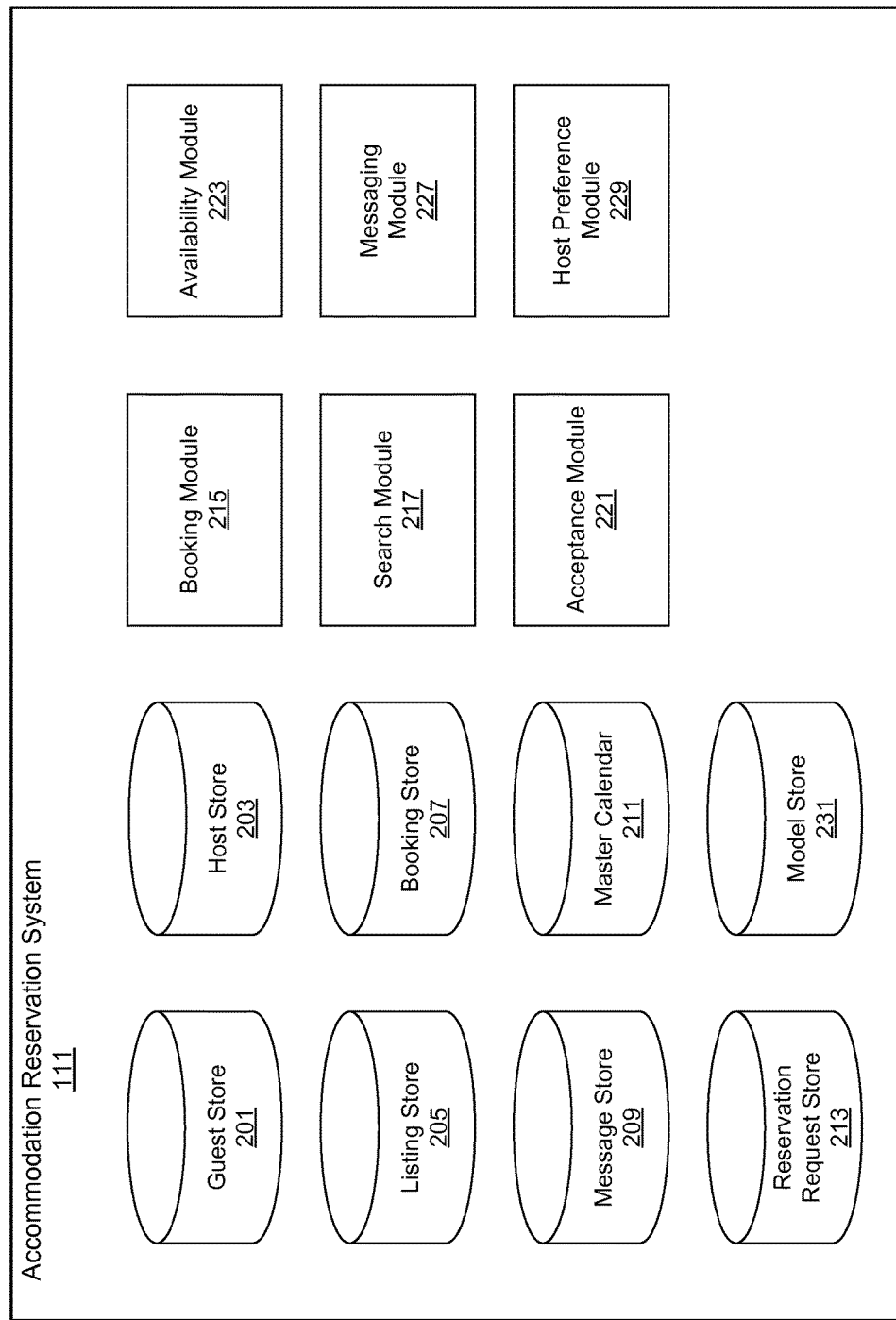
FIG. 2 is a block diagram illustrating the different modules and stores included in the online booking system in accordance with one embodiment.
Figure 3:
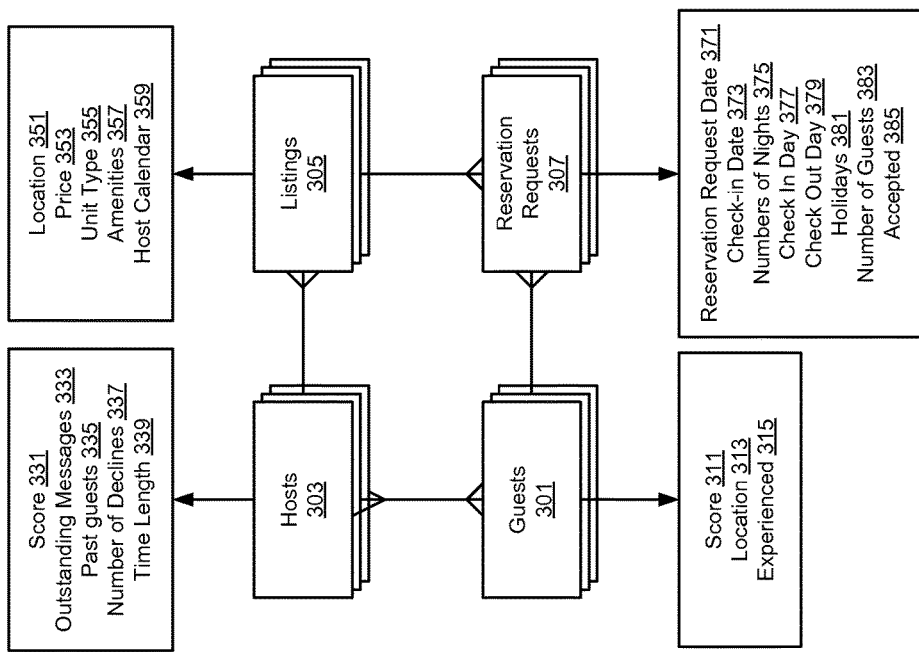
FIG. 3 is an illustration of the class diagram of the online booking system in accordance with one embodiment.

Referring to FIG. 2 and FIG. 3, in one embodiment the online booking system 111 comprises a guest store 201, a host store 203, a listing store 205, reservation request store 213, a booking store 207, a message store 209, a calendar 211, a booking module 215, a search module 217, an acceptance module 221, an availability module 223, and a messaging module 227. Those of skill in the art will appreciate that the online booking system 111 may contain other modules that are not described herein. In addition, conventional elements, such as firewalls, authentication systems, payment processing systems, network management tools, load balancers, and so forth are not shown as they are not material to the invention.

The system 111 may be implemented using a single computer, or a network of computers, including cloud-based computer implementations. The computers are preferably server class computers including one or more high-performance CPUs and 1G or more of main memory, and running an operating system such as LINUX or variants thereof. The operations of the system 111 as described herein can be controlled through either hardware or through computer programs installed in non-transitory computer storage and executed by the processors to perform the functions described herein. The various stores (e.g., guest store 201, host store 203, etc.) are implemented using non-transitory computer readable storage devices, and suitable database management systems for data access and retrieval. The system 111 includes other hardware elements necessary for the operations described here, including network interfaces and protocols, input devices for data entry, and output devices for display, printing, or other presentations of data.

The guest store 201 persistently stores data describing users (i.e., guests) that inquire about listings for accommodation in the online booking system 111, and is one means for performing this function. Each guest is represented by a guest object 301, which may also be called a guest profile. The guest object 301 stores a unique identifier associated with a given guest and information about the guest. The information may include personal information such as name, user name, email address, location, phone number, gender, date of birth, personal description, education, work, reviews from other users, pictures, and the like. The information may also include a guest score 311 and an experienced flag 315. The guest score 311 provides a numerical representation of the user's previous behavior as a guest. In some embodiments, the guest score is based on the scores (e.g., ratings) assigned by hosts from the guest's previous bookings. The experienced flag 315 shows whether the guest is a frequent user of the online booking system 111, and may be based, for example, on the total number of times a guest has booked an accommodation through the online booking system 111, the number of times a guest has used the online booking system 111 in the recent past (e.g., number of accommodations a guest has booked in the past 60 days), the length of time the guest has used the reservation system 111, or a combination of thereof.

The host store 203 persistently stores data describing users, herein "hosts," that provided or are willing to provide accommodation to other users of the online booking system 111, and is one means for performing this function. Each host is represented by host object 303, which may also be called a host profile. Information about hosts include personal information such as name, user name, email address, location, phone number, gender, date of birth, personal description, education, work, reviews from other users, pictures, and the like. Furthermore, the host store 203 may store additional information such as host score 331, outstanding messages 333, past guests 335, number of declines 337, and time length 339. Each host object 303 is associated with one or more listings 305, and with one or more guest objects 301. Each host is assigned a unique host ID.

The host score 331 provides a numerical representation of the user's previous behavior as a host. The host score can be based on the rating assigned by guests from the host's previous bookings. Generally, each time a guest who books an accommodation from a host can provide a rating of the host as well as the accommodation. The ratings are then aggregated into a host score. The ratings can be weighted according to the guests' own scores 311, as well as decayed based on the age of the rating (i.e., how old the rating is).

A host can also use the online booking system 111 to request accommodations from other hosts, hence becoming a guest. In this case the user will have a profile entry in both the guest store 201 and the host store 203. Embodiments of the online booking system 111 may combine the guest store 201 and the host store 203 into a single user profile store. The user profile store will then store the personal information as well as any guest related information and host related information if applicable. This scheme reduces the amount of redundant information between the guest store 201 and the host store 203 when a user utilizes the online booking system to both offer accommodation and reservation request accommodation.

The online booking system 111 enables, via the messaging module 227, guests and hosts to send messages to each other regarding accommodations. Outstanding messages 333 counts the number of messages from guests that the host has not responded to (i.e., number of messages waiting for a response). Outstanding messages 333 measures the responsiveness of a host to guests' reservation requests.

Past guests 335 counts the number of guests the host has accommodated. One embodiment counts the total number of guests a host has accommodated since the host started using the online booking system 111. Another embodiment only considers the number of guests a host has accommodated in the recent past (e.g., in the past 30 days).

Number of declines 337 counts the number of times the host has rejected a reservation request from a potential guest. A host may decline a reservation request for any number of reasons. For example, a reservation request from a guest for a particular accommodation may not have met been for a sufficient number of nights; or the accommodation was not in fact available and the host did not updated the listing's calendar, as further described below.

Time length 339 measures the amount of time the host has been offering accommodation through the online booking system 111.

The listing store 205 stores information about the accommodations offered by hosts through listings, and is one means for performing this function. Each offering of a given accommodation is represented by listing object 305. Information about a listing includes the location 351, price 353, unit type 355, amenities 357, and calendar 359. The listing store 205 may contain additional information such as a short description of the accommodation, a list of house rules, photographs, etc. Each listing 305 is assigned a unique listing ID. Each listing 305 is associated with a single host object 303.

Location 351 identifies the geographic location of the accommodation, such as the complete address, neighborhood, city, and/or country of the accommodation offered.

Price 353 is the amount of money a guest needs to pay in order to obtain the listed accommodation. The price 353 may be specified as an amount of money per day, per week, per day, per month, and/or per season, or other period of time specified by the host. Additionally price 353 may include additional charges such as cleaning fee, pet fee, and service fees.

Unit type 355 describes the type of accommodation being offered by the host. Embodiments classify unit type into two groups, room type and property type. Types of room include entire home or apartment, private room, and shared room. Types of property include apartment, house, bed & breakfast, cabin, villa, castle, dorm, treehouse, boat, plane, parking space, car, van, camper or recreational vehicle, igloo, lighthouse, yurt, tipi, cave, island, chalet, earth house, hut, train, tent, loft, and the like.

Amenities 357 list the additional features that an accommodation offers. Amenities include smoking allowed, pets allowed, TV, cable TV, internet, wireless internet, air conditioning, heating, elevator, handicap accessible, pool, kitchen, free parking on premise, doorman, gym, hot tub, indoor fireplace, buzzer or wireless intercom, breakfast, family or kid friendly, suitable for events, washer, drier, and the like.

The host calendar 359 stores the availability of the accommodation for each date in a date period, as specified by the host or determined automatically (e.g., through a calendar import process). That is, a host accesses the host calendar 359 for a listing, and manually indicates which dates that the listing is or is not available. The host calendar 359 also includes information about the dates that the accommodation is unavailable because it has already been booked by a guest. In addition, the host calendar 359 continues to store historical information as to the availability of the accommodation. Further, the host calendar 359 may include calendar rules, e.g., the minimum and maximum number of nights allowed.

The reservation request store 213 stores reservation requests made by guests, and is one means for performing this function. Each reservation request is represented by reservation request object 307. Information stored about reservation requests include reservation request date 371, check-in date 373, number of nights 375, day of the week for check in 377, day of the week for check out 379, holidays 381, and number of guests 383. Each reservation request 307 is assigned a unique reservation request ID. A given reservation request 307 is associated with an individual guest 301 and listing 305.

Reservation request date 371 specifies the date the reservation request was made. Check-in date 373 is the first day that accommodation is needed by the inquiring guest. Number of nights 375 specifies the number of nights the accommodation is needed by the guest. Check in day 377 and check out day 379 specify the day of the week (i.e. Monday, Tuesday, Wednesday, etc) that check in or check out is required. This information does not need to be provided by the guest since it can be inferred from the check-in date 373 and the number of nights 375. This information is important since some hosts prefer or allow for only check in and/or check out in specific days of the week (e.g., only on weekdays or only on weekends). Holidays 381 indicates the dates (if any) of holidays within the inquired accommodation period. Number of guests 383 stipulates the total number of people that are staying in the accommodation.

Reservation requests 307 can be accepted or rejected by the host 303 of the listing 305 with which the reservation request 307 is associated, and the accepted flag 385 indicates whether the reservation request 307 was accepted or rejected by the host 303. Reservation requests 307 can also expire if they are not accepted by the host 303 of the listing 305 within a threshold amount of time. In some embodiments the expiration time of reservation requests 307 is set by the online booking system 111 (e.g., reservation requests 307 expire if they are not accepted within 24 hours since the time the reservation request 307 was submitted). In other embodiments the expiration time of reservation requests 307 can be specified by the host 303 or the guest 301. In yet other embodiments, reservation requests 307 may expire if they are not accepted a threshold amount of time prior to the date 373 the accommodation was inquired for (e.g., reservation requests 307 may expire if they are not accepted two days before the day the check-in date 373).

The message store 209 stores all the communications between hosts 103 and guests 101, as exchanged via the messages module 227, and is one means for performing this function. Each message is associated with a guest 101, a host 103 and a listing 107. Guest may contact one or more hosts to obtain more information about their respective listings. Some guests may also use messages as a means to obtain more information about the hosts and vise versa.

Additionally, the online booking system 111 may assign scores to hosts and guests based on their responsiveness to incoming messages. Every host and guest may be assigned a response rate score based on the percentage of messages they reply to. Also users may be assigned a response time score based on the time average time it takes for them to respond to incoming messages.

The master calendar 211 stores information indicating the availability of every listing in the listings store 205, and is one means for performing this function. Each host is responsible for updating the listing calendar 359 for every listing they post in the online booking system 111. This information is used to form the master calendar 211.

The search module 217 receives an input query from a guest and returns a list of accommodation listings that best match the input query, and is one means for performing this function. The search query includes search parameters regarding the guest's trip, such as location (e.g., postal code, city name, and country), check in date, check out date, number of guests, and the like; and the guest's accommodations preferences, such as room type, price range, amenities, and the like. The search module then retrieves all the listings that match the search query. In one embodiment, Boolean matching is used for parameters such as location and date, room type and price range, with additional parameters used to further filter the results.

In some embodiments the search module 217 ranks the returned search results based on a ranking score. The ranking score is a function of a number of factors, such as price, host rating, distance from preferred location, listing, or a combination thereof. The ranking function can be implemented as a linear combination or a multiplicative combination of the individual factors, where each factor is represented as a scaled variable indicating a degree of match (e.g., 1 of an exact match of the underlying search parameter, 0.5 for a partial or near match), and weighted with a weight to reflect the importance of the factor. Typically, location and date are highly weighted, and amenities are lesser weighted, but the particular weights are a design decision for the system administrator. In one embodiment, the ranking factors include information provided by the availability module 223 and the acceptance module 221, as further described below.

The acceptance module 221 calculates the probability of acceptance (PC) of a reservation request by a particular guest for a particular listing by the host, and is one means for performing this function. Embodiments of the acceptance module 221 use an acceptance model for each host, based on reservation requests for listings that the host has accepted and rejected historically. For given listing that satisfies a user search, the acceptance module 221 calculates the probability that if a reservation request for the given listing is made by that guest, the host will accept that reservation request. The search module 217 can use the probability of acceptance as a ranking factor, when ranking the search results or to filter listings with a probability of acceptance lower than a threshold score. Generally, the search module 217 ranks more highly listings that have a high probability of being accepted by the host, and ranks more lowly listings that have a low probability of being accepted.

The booking module 215 allows guests 301 to reserve an accommodation offered through a listing 305, and is one means for performing this function. In operation, the booking module 215 receives a reservation request 307 from a guest 301 to reserve an accommodation offered by a particular listing 305. The reservation request includes reservation parameters, much like the search parameters in a search query, including check in date, check out date, and the number of guests. The booking module 215 presents the reservation request including the reservation parameters to the host 303 associated with the listing 305, and the host 303 may either accept or reject the reservation request. If the host 303 accepts the reservation request, then the booking module 215 updates the accepted flag 485 to indicate that the reservation request was accepted and also updates the booking store 207 and flags the booked days for the listing as unavailable upon a host accepting a guest's reservation request. The booking store 207 stores information about all the accepted and subsequently booked accommodation reservation requests. Each entry in the booking store 207 is associated with a host 303, a guest 301 and a listing 305.

Modeling Host Preferences

For a given listing 305, patterns may emerge with regards to the types of reservation requests 307 that are accepted by the host 303 and the types of reservation requests 307 that are rejected by the host 303 associated with the listing 305. The host preference module 229 models the preferences of a host 303 of a particular listing 305 based on the acceptance patterns of reservation requests for the listing 305, and is one means for performing this function. The preference model is listing specific. Therefore, a different preference model is generated for each listing associated with a given host in the online booking system 111. For the ease of discussion, a preference model for a given host and listing combination is referred to hereinafter as a listing-specific preference model. The host preference module 229 uses a listing-specific preference model to estimate the probability that a new reservation request 307 for the listing 305 will be accepted by the host 303. In other embodiments, the preference model is host specific, and covers all of the listings offered by a given host; thus there is one preference model per host.

Data Used to Generate Preference Model

To generate a listing-specific preference model, the host preference module 229 identifies a set of request features for classifying reservation requests. In one embodiment, a request feature is binary—a reservation request either possesses the feature or does not possess the feature. Request features may be of many different types. Specifically, some request features may be related to the reservation request itself. Examples of such request features include whether the reservation request is for a given number or range of nights, whether the reservation request is for a given number or range of guests, whether the number of nights specified by the reservation request equals the maximum number of nights specified for a listing, whether the number of guests equals the maximum/minimum number of guests specified for a listing, whether the requested accommodation falls on a holiday or a weekend, whether the gap between the check-in date and a previous check-out date of a different reservation is above/below a threshold or within a range, and the day/time of day of the reservation request. In other embodiments, a request feature can be represented by a weight value that indicates the degree to which the reservation request has the feature, to allow for partial or fuzzy matching. In another embodiment, a request feature is a numeric variable representing, for example, the number of nights.

Further, some request features may be related to the guest from whom the reservation request was received or the host associated with the listing. Examples of request features related to the guest include whether the guest is experienced, whether the score of the guest is above/below a threshold, whether the guest has been verified, and whether the guest has a picture associated with his/her profile. Examples of request features related to the host include whether the host was previously contacted by the guest, whether the host replied to the guest, and whether the host has outstanding messages. Persons skilled in the art will recognize that other request features not explicitly listed above are within the scope here.

The host preference module 229 generates a feature vector for each reservation request based on the identified set of request features and the historical data stored in the guest store 201, host store 203, listing store 205, message store 209, and reservation request store 213. For a given reservation request, the feature vector includes a binary value for each request feature, forming a bit vector. If the reservation request possesses the feature, then the binary value indicates a "1" or a "true." Conversely, if the reservation request does not possess the feature, then the binary value indicates a "0" or a "false." For the remainder of this discussion, a request feature is also referred to as $f_x$, where each x denotes a type of the request feature. For a given reservation request, then, the feature vector takes the form of: $[f_a, f_b, f_c, \ldots, f_n]$, where the binary value for each of $f_a$, $f_b$, $f_c$, $\ldots$, and $f_n$ depends on whether the reservation request possesses the feature. The feature vector also includes an acceptance value that indicates whether the reservation request for the listing was accepted or rejected by the host. For the remainder of this discussion, the acceptance value feature is also referred to as A. As noted, in another embodiment, the request features can be represented by weights, to form a vector of real numbers (e.g., values between 0 and 1), or a combination of binary and real numbers.

Figure 4:
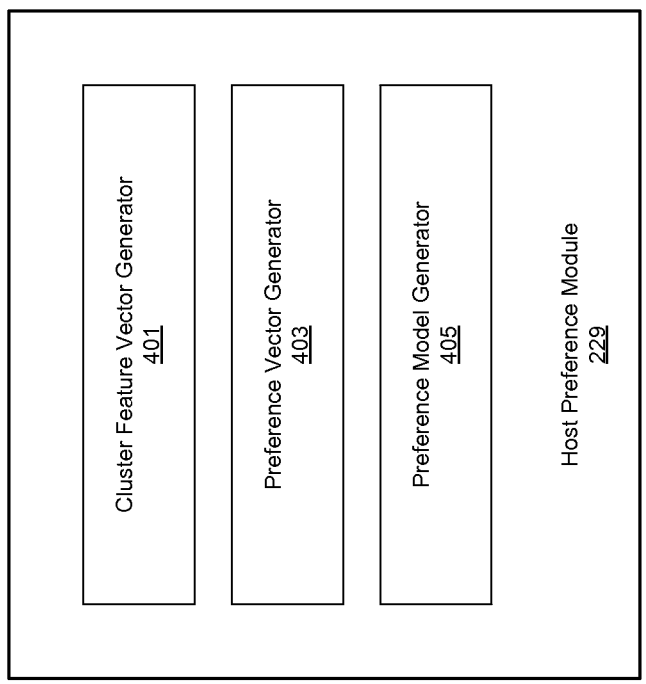
FIG. 4 is a detailed illustration of the host preference module 229 configured to generate a listing-specific preference model based on regional data in accordance with one embodiment.
Figure 5:
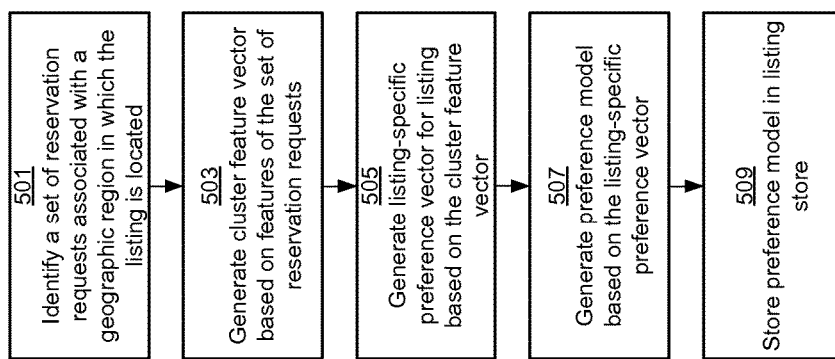
FIG. 5 is a flowchart of an exemplary method for generating a listing-specific reservation request preference model based on regional data in accordance with one embodiment.
Figure 6:
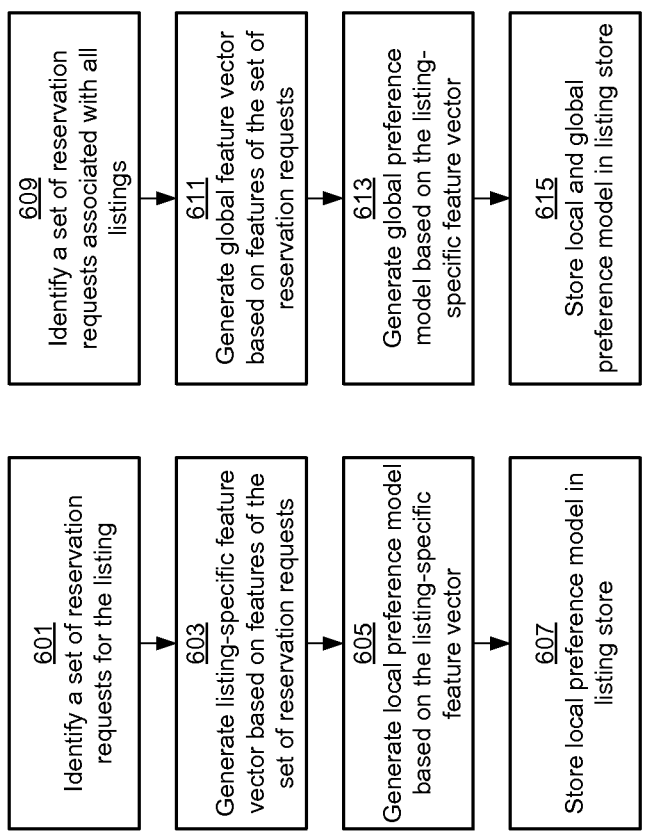
FIG. 6A is a flowchart of an exemplary method for generating a local preference model for a listing based on data associated with the listing in accordance with one embodiment.
FIG. 6B is a flowchart of an exemplary method for generating a global preference model based on global data in accordance with one embodiment.
Figure 7:
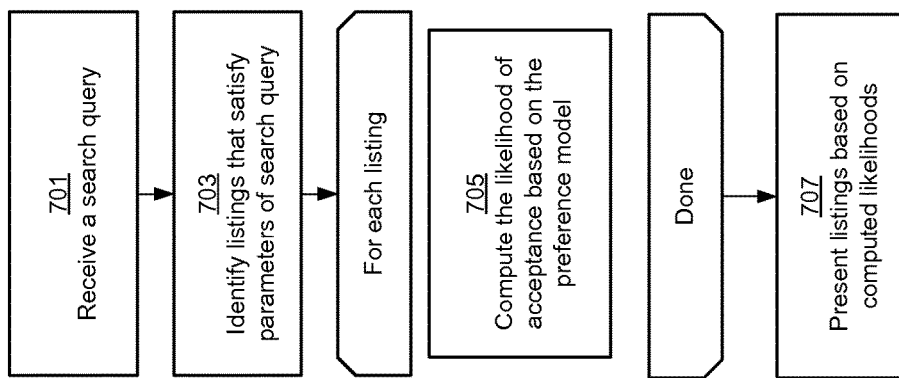
FIG. 7 is a flowchart of an exemplary method for generating search results for a search query based on preference models in accordance with one embodiment.

Often there is insufficient historical data available to create an accurate listing-specific preference model. To address this insufficiency of data, two different approaches may be taken by the host preference module 229. In the first approach, the historical data for a first listing is augmented with historical data for other listings having one or more common attributes with the first listing (referred to herein as the "cluster approach"). FIG. 4 and FIG. 5 and the corresponding description include details of the cluster approach. In the second approach, historical data for all listings is used instead of data specific to the listing or the region (referred to herein as the "individual approach"). FIG. 6 and the corresponding description include details of the individual approach. With both approaches, the preference model that is generated allows the host preference module 229 to estimate the probability that a future reservation request for the listing will be accepted by a host. FIG. 7 and the corresponding description include details of using a preference model to improve search results presented to a prospective guest.

Cluster Approach to Generating a Preference Model

In the cluster approach, the host preference module 229 generates the listing-specific preference model based on a cluster of reservation requests. The cluster includes reservation requests for the listing as well as reservation requests for other listings having one or more attributes in common with the listing. The attribute may be the listings being in the same geographic region, having the same type (e.g., room type), having the same type of host (e.g., property manager), or may be based on collaborative filtering. Training the model based on cluster data, as opposed to data associated with only the listing, enables the host preference module 229 to generate an accurate model when the data associated with the listing is insufficient.

The following discussion describes the process for generating a listing-specific preference model for a cluster of reservation requests for listings in the same region. Persons skilled in the art would readily understand that the described process may be used to generate a listing-specific preference model for a cluster of reservation requests for listings having one or more different common attributes, such as having the same listing type or host type.

FIG. 4 is a detailed illustration of the host preference module 229 configured to generate a listing-specific preference model based on cluster data in accordance with one embodiment. As shown, the host preference module 229 includes a cluster feature vector generator 401, a preference vector generator 403, and a preference relevance generator 405. The functional details of these components are discussed below with reference to generating a listing-specific preference model for listing L located in region G and hosted by host H.

The cluster feature vector generator 401 (also "generator 401") generates a cluster feature vector for a collection of previously received reservation requests for listings included in a particular cluster, and is one means for performing this function. In operation, for listing L, the generator 401 identifies the geographic region G within which the listing L is located. A geographic region may be a neighborhood, zip code, city, county, a country, or any arbitrary geographic area determined by the host preference module 229. The generator 401 identifies a collection of previously received reservation requests for listing L as well as reservation requests for other listings in region G. In one embodiment, reservation requests for only a subset of all the other listings in region G are selected. The subset of listings may be selected arbitrarily or based on a similarity between listing L and the subset of the other listings. For example, the subset may be those listings having the same unit type as listing L and within region G. Further, only a subset of reservation requests for a given listing may be selected for the set of reservation requests. For example, only those reservation requests made within a particular time period, such as the last six months, may be selected.

The generator 401 generates a feature vector for each reservation request in the set of reservation requests. As discussed above, for a given set of request features, a feature vector identifies whether the reservation request possesses each of the request features. The many different types of request features are listed above, but let's assume that the feature vectors generated by the generator 401 include four features $f_a$, $f_b$, $f_c$, and $f_d$, and the acceptance value A. In this example, the value of $f_a$ indicates whether the requested accommodation fell on a weekend/holiday. The value of $f_b$ indicates whether the requested accommodation was for the maximum number of nights offered for the listing. The value of $f_c$ indicates whether the check-in date for the requested accommodation was at least 1 full day after the check-out date for a previous booking. The value of $f_d$ indicates whether the host had previously been contacted by the guest. The value of A indicates whether the host accepted or rejected the reservation request.

For each feature vector, the generator 401 accesses the relevant store(s) in the online booking system 111 that store data enabling the generator 401 to determine whether the associated reservation request possesses each request feature. For example, for $f_a$, the generator 401 accesses the reservation request store 312 to determine the specifics dates for which the reservation request was made. If the dates fell on a weekend/holiday, then $f_a$ is set to "1." If the dates did not fall on a weekend/holiday, then $f_a$ is set to "0." Similarly, for $f_b$, the generator 401 accesses the reservation request store 312 to determine the number of nights for which the reservation request was made. The generator 401 also accesses the listing store 205 to determine the maximum number of nights specified for the listing. In the numbers match, then $f_b$ is set to "1." If the numbers do not match, then $f_b$ is set to "0." In such a manner, the generator 401 accesses the data in the different stores to fill in the feature vector for each of the set of reservation requests.

The generator 401 then combines the individual feature vectors for the set of reservation requests to generate a cluster feature vector that represents the set of reservation requests. For example, if there are three listings including listing L in the region G, then the feature vectors of reservation requests for the three listings are combined to generate the cluster feature vector. Assume that, in such an example, five reservation requests have been made for the three listings. The cluster feature vector may then take the form of:

$$\begin{pmatrix} f_a & f_b & f_c & f_d & A \\ 1 & 0 & 1 & 1 & 0 \\ 0 & 0 & 0 & 1 & 0 \\ 1 & 0 & 0 & 1 & 1 \\ 1 & 1 & 1 & 0 & 1 \\ 0 & 1 & 1 & 1 & 0 \end{pmatrix}$$

where each column of the vector corresponds to one of $f_a$, $f_b$, $f_c$, $f_d$, and A, and each row corresponds to a different reservation request for one of the three listings. In this example, the first two rows may correspond to reservation request 1 and reservation request 2 for listing L, rows three and four may correspond to reservation request 1 and reservation request 2 for listing M in region G, and the last row may correspond to reservation request 1 for listing N in region G.

The preference vector generator 403 (also "generator 403") processes the cluster feature vector to generate a listing-specific preference vector, and is one means for performing this function. The listing-specific preference vector identifies a preference value of a host of a particular listing for each request feature. The preference vector takes the form of: $[\beta_{la}, \beta_{lb}, \beta_{lc}, \ldots, \beta_{ln}]$.

To compute the listing-specific preference vector, the generator 403 first computes a cluster preference value for each request feature in the cluster feature vector. A cluster preference value for a given request feature combines the preferences of all listings in the cluster, e.g., listings in the same region, by computing the average or median of the preference across all listings or reservation requests represented by the cluster feature vector. In one embodiment, a cluster preference value is computed using the following formula:

$$\beta_x = \frac{\sum_{i=1}^{T} f_x \times A}{\sum_{i=1}^{T} f_x}$$

where $\beta_x$ is the cluster preference value for a given request feature, T is the total number of reservation requests represented by the cluster feature vector, $f_c$ is the value of the request feature for a given reservation request represented by the cluster feature vector, and A is the value that indicates whether or not the reservation request was accepted by the host.

Continuing the example above with reservation requests for listings L-N, the cluster preference value $\beta_a$ for request feature $f_a$ can be computed by evaluating the following equation. When evaluated, the value of $\beta_a$ is ~0.67.

$$\beta_a = \frac{\sum_{i=1}^{5} f_a \times A}{\sum_{i=1}^{5} f_x}$$

Once the cluster preference values are computed for each of the request features, the generator 403 can compute the listing-specific preference vector for the particular listing. Again, the listing-specific preference vector identifies a preference value of a host of a particular listing for each request feature. In operation, the generator 403 computes a listing-specific preference value for each request feature based on a combination of the cluster preference value and a local preference value for the feature. The local preference value for a given request feature indicates the median or mean preference for the request feature across all reservation requests for the particular listing. In one embodiment, a local preference value is computed using the following formula:

$$\beta_{lx} = \frac{\sum_{i=1}^{Y_l} f_x \times A + k\beta_x}{\sum_{i=1}^{Y_l} f_x + k}$$

where $\beta_{lx}$ is the listing-specific preference value for a given request feature, $Y_l$ is the total number of reservation requests represented in the cluster feature vector for the listing l, $f_x$ is the value of the request feature for a given reservation request represented in the cluster feature vector, A is indicating whether the reservation request was accepted or rejected by the host, and k is a weight to be assigned to the cluster preference value for the request feature.

Continuing the example above with reservation requests for listings L-N, the listing-specific preference value $\beta_{la}$ for request feature $f_a$ can be computed by evaluating the following equation. In the equation below, the weight k is set to 0.5. Any other suitable weight is within the scope. When evaluated, the value of $\beta_{la}$ is ~0.13.

$$\beta_{la} = \frac{\sum_{i=1}^{2} f_a \times A + 0.5 \times 0.67}{2 + 0.5}$$

As discussed above, the listing-specific preference values $[\beta_{la}, \beta_{lb}, \beta_{lc}, \ldots, \beta_{ld}]$ form the listing-specific preference vector. The preference model generator 405 (also the "generator 405") generates the listing-specific preference model for a listing based on the listing-specific preference vector, and is one means for performing this function. To generate the model, the generator 405 first generates the training data set for the model. The training data set is generated by applying the listing-specific preference vector to the feature vectors of the reservation requests for the listing represented by the cluster feature vector. Specifically, for a given feature vector, the value of each request feature is multiplied by the listing-specific preference value for that request feature to generate a preference score. The collection of resulting feature vectors form the training data set for the model.

The generator 405 next estimates based on the training data set the effect of each preference on whether a host ultimately accepts or rejects a reservation request. The estimated effect of each preference is a parameter of the preference model, and the collection of the parameters form the preference model. In one embodiment, the generator 405 computes the parameters of the preference model using a logistic regression that identifies the statistical relationship between the acceptance or rejection of a reservation request as represented by A and the request features. Specifically, the generator 405 sets up an equation associated with each reservation request represented by the cluster feature vector. Each equation takes the form of:

$$A = \theta_o + [\theta_a \times \beta_{la} \cdot f_a] + [\theta_b \times \beta_{lb} \cdot f_b] + [\theta_c \times \beta_{lc} \cdot f_c] + [\theta_d \times \beta_{ld} \cdot f_d]$$

where A is the value indicating whether the reservation request was accepted or rejected, $\theta_o$ is a constant parameter of the parameter model, $\theta_a$ is a parameter of the parameter model that indicates the statistical relationship between $f_a$ and A, $\beta_{la} \cdot f_a$ is the preference score for request feature $f_a$ in the training data set, $\theta_b$ is a parameter of the parameter model that indicates the statistical relationship between $f_b$ and A, $\beta_{lb} \cdot f_b$ is the preference score for request feature $f_b$ in the training data set, $\theta_c$ is a parameter of the parameter model that indicates the statistical relationship between $f_c$ and A, $\beta_{lc} \cdot f_c$ is the preference score for request feature $f_c$ in the training data set, and $\theta_d$ is a parameter of the parameter model that indicates the statistical relationship between $f_d$ and A, $\beta_{ld} \cdot f_d$ is the preference score for request feature $f_d$ in the training data set.

The generator 405 then processes the equations to estimate values for the parameters: $\theta_o$, $\theta_a$, $\theta_b$, $\theta_c$, and $\theta_d$. Collectively, the parameters form the preference model associated with the collection of listings included in the region. The preference model can be used to estimate the probability that a future reservation request for the listing will be accepted by the host of the listing. As discussed in detail in conjunction with FIG. 7 below, such a probability can be used to rank and filter search results for listings.

FIG. 5 is a flowchart of an exemplary method for generating a listing-specific reservation request preference model based on regional data in accordance with one embodiment. The method in FIG. 5 is described in the context of generating the preference model for listing L. The method begins with the host preference module 229 identifying 501 a set of reservation requests for listings, including listing L, in the geographic area in which listing L is located. Each reservation request has previously been accepted or rejected by the host of the listing.

The host preference module 229 generates 503 a cluster feature vector based on features of the identified set of reservation requests. Specifically, the host preference module 229 first generates a feature vector for each of the set of reservation requests. Each feature vector indicating whether or not the reservation request possesses each of a set of request features. The feature vectors for the set of reservation requests collectively form the cluster feature vector.

The host preference module 229 generates 505 a listing-specific preference vector for listing L based on the generated cluster feature vector. The listing-specific preference vector includes a preference value of the host of listing L for each request feature. To generate the listing-specific preference vector, the host preference module 229 first computes a regional median or mean preference for each request feature across all listings represented by the cluster feature vector. The regional median or mean preference is combined with the host's preference for the request feature to compute the preference value of the host of listing L for the request feature.

Based on the listing-specific preference vector, the host preference module 229 generates 507 the preference model for the region to which listing L belongs. The preference model indicates the statistical relationship between the acceptance of a reservation request and each request feature. To determine the model, the generator 405 first generates the training data set for the model. The training data set is generated by applying the listing-specific preference vector to the feature vectors of the reservation requests for listings in the region. The host preference module 229 then estimates based on the training data set the statistical relationship between the acceptance of a reservation request, each request feature, and the host/listing preferences. The estimated statistical relationship is a parameter of the preference model, and the collection of the parameters form the preference model.

The host preference module 229 stores 509 the preference model in the model store 231 in association with the region to which the listings belong. The preference model may be updated periodically based on data associated with new reservation requests for listing L and/or the other listings in the region.

Individual Approach to Generating a Preference Model

In the individual approach, the host preference module 229 generates two preference models: (i) a local preference model generated based on reservation requests for the listing, and (ii) a global preference model generated based on reservation requests across all listings available in the online booking system 111. FIG. 6A describes the process for generating the local preference model, and FIG. 6B describes the process for generating the global preference model. When the data associated with the listing is sufficient to generate an accurate model, the local preference model is used to predict the probability of a future reservation request for the listing being accepted. When the data associated with the listing is insufficient, the global preference model is used to predict the probability for the future reservation request being accepted.

FIG. 6A is a flowchart of an exemplary method for generating a local preference model for a listing based on data associated with the listing in accordance with one embodiment. The method in FIG. 6A is described in the context of generating the preference model for listing L. The method begins with the host preference module 229 identifying 501 a set of reservation requests for the listing L. Each reservation request has previously been accepted or rejected by the host of the listing L.

The host preference module 229 generates 603 a listing-specific feature vector based on features of the identified set of reservation requests. The listing-specific feature vector includes a vector for each of the set of reservation requests. For a given reservation request, a feature vector identifies whether the reservation request possesses each of a set of request features. Let's assume that the feature vectors generated by the generator 401 include four features $f_a$, $f_b$, $f_c$, and $f_d$, and the acceptance value A. The host preference module 229 combines the individual feature vectors for the set of reservation requests to generate the listing-specific feature vector that represents the set of reservation requests. For example, assume that five reservation requests have been made for listing L. The listing-specific feature vector for listing L may then take the form of:

$$\begin{pmatrix} f_a & f_b & f_c & f_d & A \\ 0 & 0 & 0 & 1 & 1 \\ 1 & 0 & 1 & 0 & 0 \\ 1 & 0 & 0 & 1 & 1 \\ 1 & 0 & 1 & 0 & 1 \\ 0 & 1 & 1 & 1 & 0 \end{pmatrix}$$

where each column of the vector corresponds to one of $f_a$, $f_b$, $f_c$, $f_d$, and A, and each row corresponds to a different reservation request for listing L.

Based on the listing-specific feature vector, the host preference module 229 generates 607 a local preference model for listing L. The local preference model indicates the statistical relationship between the acceptance of a reservation request for listing L and each request feature. The training data set for the local preference model is generated based on the listing-specific feature vector. The host preference module 229 estimates based on the training data set the statistical relationship between the acceptance of a reservation request and each request feature. The estimated statistical relationship of each request feature is a parameter of the preference model, and the collection of the parameters form the preference model.

In one embodiment, the host preference module 229 computes the parameters of the local preference model using a logistic regression that identifies the statistical relationship between the acceptance or rejection of a reservation request as represented by A and the request features. Specifically, the host preference module 229 sets up a set of equations, each equation associated with a different reservation request represented by the listing-specific feature vector for listing L. Each equation takes the form of:

$$A = \gamma_o + [\gamma_a \times f_a] + [\gamma_b \times f_b] + [\gamma_c \times f_c] + [\gamma_d \times f_d]$$

where A is the value indicating whether the reservation request was accepted or rejected, $\gamma_o$ is a constant parameter of the parameter model, $\gamma_a$ is a parameter of the parameter model that indicates the statistical relationship between $f_a$ and A, $f_a$ is the value for request feature $f_a$ in the listing-specific feature vector, $\gamma_b$ is a parameter of the parameter model that indicates the statistical relationship between $f_b$ and A, $f_b$ is the value for request feature $f_b$ in the listing-specific feature vector, $\gamma_c$ is a parameter of the parameter model that indicates the statistical relationship between $f_c$ and A, $f_c$ is the value for request feature $f_c$ in the listing-specific feature vector, and $\gamma_d$ is a parameter of the parameter model that indicates the statistical relationship between $f_d$ and A, $f_d$ is the value for request feature $f_d$ in the listing-specific feature vector. The host preference module 229 then processes the equations to estimate values for the parameters: $\gamma_o$, $\gamma_a$, $\gamma_b$, $\gamma_c$, and $\gamma_d$. Collectively, the parameters form the local preference model associated with listing L. The local preference model can be used to estimate the probability that a future reservation request for the listing will be accepted by the host of the listing.

The host preference module 229 stores 607 the local preference model in the listing store 205 in association with listing L. The local preference model may be updated periodically based on data associated with new reservation requests for listing L.

FIG. 6B is a flowchart of an exemplary method for generating a global preference model based on global data in accordance with one embodiment. The method begins with the host preference module 229 identifying 609 a set of reservation requests associated with all the listings in the online booking system 111. Each reservation request has previously been accepted or rejected by the host of the listing.

The host preference module 229 generates 611 a global feature vector based on features of the identified set of reservation requests. The global feature vector includes a vector for each of the set of reservation requests. For a given reservation request, a feature vector identifies whether the reservation request possesses each of a set of request features. Let's assume that the feature vectors generated by the generator 401 include four features $f_a$, $f_b$, $f_c$, and $f_d$, and the acceptance value A. The host preference module 229 combines the individual feature vectors for the set of reservation requests to generate the global feature vector that represents the set of reservation requests.

Based on the global feature vector, the host preference module 229 generates 613 a global preference model. The global preference model indicates the statistical relationship between the acceptance of a reservation request for any listing and each request feature. The training data set for the global preference model is generated based on the global feature vector which includes feature vectors for all reservation requests across all listings. The host preference module 229 estimates based on the training data set the statistical relationship between the acceptance of a reservation request and each request feature. The estimated statistical relationship of each request feature is a parameter of the global preference model, and the collection of the parameters form the global preference model.

In one embodiment, the host preference module 229 computes the parameters of the local preference model using a logistic regression that identifies the statistical relationship between the acceptance or rejection of a reservation request as represented by A and the request features. The specifics of the logistic regression in this embodiment are the same as those discussed above with the local preference model.

The host preference module 229 stores 615 the global preference model in the listing store 205. The global preference model may be updated periodically based on data associated with new reservation requests for the listings in the online booking system 111.

Improving Search Results with Preference Models

Preference models generated by the host preference module 229 may be used the search module 217 to improve the search results presented to a prospective guest in response to receiving a search query. Specifically, a preference model may be used by the search module 217 to determine a probability that a reservation request for a listing associated with a search result would be accepted by the host of the listing. The search module 217 may then rank the search results according to the determined probabilities and/or filter certain search results having a determined probability below a threshold.

FIG. 7 is a flowchart of an exemplary method for generating search results for a search query based on preference models in accordance with one embodiment. The method beings with the search module 217 receiving 701 a search query from a guest. A search query typically includes several parameters that define the scope of the query. Parameters may include the geographic region, unit type, check-in and check-out dates, and the number of guests. In response to the search query, the search module 217 identifies 703 a set of listings in the listing store 205 that satisfy the search parameters.

For each listing, the search module 217 computes 705 based on a preference model associated with the listing the probability that a prospective reservation request for the listing, matching the parameters of the search query, from the guest would be accepted by the host of the listing. The computation of the probability differs depending on whether the host preference module 229 is following the cluster approach or the individual approach.

In the case of the cluster approach, the search module 217 selects the preference model stored in the preference module store 231. The search module 217 then identifies the parameters specified in the preference model and applies those parameters derived from the search query to the parameters derived from the search query. Specifically, the search module 217 breaks the search query into request features and applies the relevant parameter to each request feature. In one embodiment, the following equation is used to apply the parameters to the prospective reservation request:

$$L = \theta_o + [\theta_a \times \beta_{la} \cdot f_a] + [\theta_b \times \beta_{lb} \cdot f_b] + [\theta_c \beta_{lc} \cdot f_c] + [\theta_a \times \beta_{ld} \cdot f_d]$$

where L is the value indicates the likelihood that the prospective reservation request will be accepted, $\theta_o$ is a constant parameter of the parameter model, $\theta_a$ is a parameter of the preference model that indicates the statistical relationship between $f_a$ and acceptance of the reservation request, $\beta_{la}$ is the listing-specific preference for request feature $f_a$, $f_a$ is the value for a request feature of the prospective reservation request, $\theta_b$ indicates the statistical relationship between a given host preference $\beta_{lb}$ and the acceptance of the reservation request, $\beta_{lb}$ is the listing-specific preference for request feature $f_b$, $f_b$ is the value for request feature for the prospective reservation request, $\theta_c$ is a parameter of the preference model that indicates the statistical relationship between $f_c$ and acceptance of the reservation request, $\beta_{lc}$ is the listing-specific preference for request feature $f_c$, $f_c$ is the value for request feature for the prospective reservation request, $\theta_d$ is a parameter of the preference model that indicates the statistical relationship between $f_d$ and acceptance of the reservation request, $\beta_{ld}$ is the listing-specific preference for request feature $f_d$, and $f_d$ is the value for request feature for the prospective reservation request.

In one embodiment, L from the equation above, i.e., the likelihood that the prospective reservation request will be accepted, is transformed into a probability using the following logistic formula:

$$\frac{1}{(1+e^{-L})}$$

In the case of the host preference module 229 following the individual approach, the search module 217 selects between the global preference module and the local preference module stored in association with the listing. The search module 217 makes the selection based on the number of historical reservation requests received for the listing based on which the local preference module was generated. When the number of reservation requests is below a threshold, then the search module 217 applies the parameters of the global preference model to the prospective reservation request. When the number of reservation requests is above a threshold, the search module 217 applies the parameters of the local preference model to the prospective reservation request. The mechanism for applying the global preference model or the local preference model to the prospective reservation request is the same as that discussed above with respect to the cluster approach. In one embodiment, when the number of reservation requests is above a threshold, the search module 217 computes a global probability based on the global preference model and a local probability based on the local preference model. The two probabilities are then combined to generate the probability of the prospective reservation request being accepted.

Once the probability of a reservation request being accepted is computed for the identified listings, the search module 217 presents 707 the listings to the prospective guest based on the computed probabilities. In one embodiment, the search module 217 ranks the listings based on the computed probabilities. Other features, such as the quality of the listings, the price, etc., may further influence the rankings of the listings. In another embodiment, the search module 217 filters listings from being presented that have computed probabilities below a threshold.

ALTERNATIVE APPLICATIONS

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method, comprising:
   identifying, by a server at a first time, a plurality of listings for a plurality of host computers, the listings associated with accommodations for booking;
   accessing, by the server, a set of reservation requests received for the listings of the host computers, each reservation request for a listing having previously been accepted or rejected by the host computer associated with the listing;

generating, by the server, a cluster feature vector for a request feature, the cluster feature vector identifying whether the reservation requests in the set of reservation requests possessed the request feature;

determining, by the server, a cluster preference numerical value for the request feature in the cluster feature vector based on (1) a number of the reservation requests in the set that were accepted and (2) a number of the reservation requests in the set that possess the request feature, wherein the request feature is a time period for reservation of the listing specified in the reservation request, the time period representing a date, a date range, or an amount of time from a date on which the reservation request was received;

storing the cluster preference numerical value for the request feature;

receiving, at a second time from a guest computer, a search query, the search query specifying the request feature;

for each of the listings,
  determining, by the server, a listing-specific preference value for the request feature based on the cluster preference numerical value and a preference value specific to the listing for the request feature;
  generating, by the server, a preference model based on the listing-specific preference value, the preference model identifying a relationship between the request feature and a reservation request for the listing being accepted or rejected by the host computer associated with the listing;
  applying, by the server, the preference model to a prospective reservation request associated with the received search query for the listing to compute a probability that the prospective reservation request will be accepted by the host computer;

ranking, by the server, the listings based on the computed probabilities; and presenting the listings to the guest computer based on the ranking.

2. The method of claim 1, wherein the request feature indicates a mechanism for classifying the set of reservation requests.

3. The method of claim 1, wherein determining the listing-specific preference value comprises:
  identifying a subset of the reservation requests that were received for the listing;
  determining a number of the reservation requests in the subset that were accepted and a number of the reservation requests in the subset that possess the request feature; and
  determining the listing-specific value based on a combination of the cluster preference value, the number of the reservation requests in the subset that were accepted and the number of the reservation requests in the subset that possess the request feature.

4. The method of claim 1, wherein generating the preference model comprises generating a training data set by applying the listing-specific value to a subset of the reservation requests that were received for the listing.

5. The method of claim 4, further comprising processing the training data set using a logistic regression to determine the relationship between the request feature and a reservation request for the listing being accepted or rejected by the host computer associated with the listing.

6. The method of claim 1, further comprising:
determining whether to display a listing to the guest computer based on the computed probability.

7. The method of claim 6, wherein determining whether to display the listing comprises comparing the computed probability with an acceptance threshold, and displaying the listing with the computed probability is equal to or above the acceptance threshold.

8. The method of claim 1, wherein a listing is for an accommodation being offered for reservation by a host computer, and the request feature is a gap feature indicating a specific period of time between a previous reservation or calendar unavailability of the accommodation ending and a reservation associated with a reservation request beginning.

9. The method of claim 1, further comprising filtering one or more listings from being presented, each of the one or more listings having a computed probability below a threshold value.

10. The method of claim 1, wherein the preference value specific to the listing for the request feature indicates a median or mean preference for the request feature across all reservation requests for the listing.

11. The method of claim 1, wherein the request feature is a count of nights associated with the reservation requests.

12. The method of claim 1, wherein the request feature is a calendar range associated with the reservation requests.

13. The method of claim 1, wherein the request feature is associated with a weight value indicating a degree to which a reservation request possessing the request feature has the request feature.

14. The method of claim 1, wherein the cluster preference numerical value for the request feature is determined based on a total number of reservation requests in the set of reservation requests, a value of the request feature for each reservation request in the set of reservation requests, and a value indicating whether or not the reservation request was accepted by the host computer.

15. The method of claim 1, wherein the listing-specific preference value for the request feature is determined based on a total number of reservation requests in the set of reservation requests, a value of the request feature for each reservation request in the set of reservation requests, a value indicating whether or not the reservation request was accepted by the host computer, and a weight to be assigned to the cluster preference numerical value for the request feature.

16. A non-transitory computer readable medium storing instructions, the instructions when executed cause the processor to perform steps, comprising:
  identifying, by a server at a first time, a plurality of listings for a plurality of host computers, the listings associated with accommodations for booking;
  accessing, by the server, a set of reservation requests received for the listings of the host computers, each reservation request for a listing having previously been accepted or rejected by the host computer associated with the listing;
  generating, by the server, a cluster feature vector for a request feature, the cluster feature vector identifying whether the reservation requests in the set of reservation requests possessed the request feature;
  determining, by the server, a cluster preference numerical value for the request feature in the cluster feature vector based on (1) a number of the reservation requests in the set that were accepted and (2) a number of the reservation requests in the set that possess the request feature, wherein the request feature is a time period for reservation of the listing specified in the reservation request, the time period representing a date, a date range, or an amount of time from a date on which the reservation request was received;

storing the cluster preference numerical value for the request feature;

receiving, at a second time from a guest computer, a search query, the search query specifying the request feature;

for each of the listings,
  determining, by the server, a listing-specific preference value for the request feature based on the cluster preference numerical value and a preference value specific to the listing for the request feature;
  generating, by the server, a preference model based on the listing-specific preference value, the preference model identifying a relationship between the request feature and a reservation request for the listing being accepted or rejected by the host computer associated with the listing;
  applying, by the server, the preference model to a prospective reservation request associated with the received search query for the listing to compute a probability that the prospective reservation request will be accepted by the host computer;

ranking, by the server, the listings based on the computed probabilities; and presenting the listings to the guest computer based on the ranking.

17. The non-transitory computer readable medium of claim 16, wherein the request feature indicates a mechanism for classifying the set of reservation requests.

18. The non-transitory computer readable medium of claim 16, wherein determining the listing-specific preference value comprises:
  identifying a subset of the reservation requests that were received for the listing;
  determining a number of the reservation requests in the subset that were accepted and a number of the reservation requests in the subset that possess the request feature; and
  determining the listing-specific value based on a combination of the cluster preference value, the number of the reservation requests in the subset that were accepted and the number of the reservation requests in the subset that possess the request feature.

19. The non-transitory computer readable medium of claim 16, wherein generating the preference model comprises generating a training data set by applying the listing-specific value to a subset of the reservation requests that were received for the listing.

20. The non-transitory computer readable medium of claim 19, further comprising processing the training data set using a logistic regression to determine the relationship between the request feature and a reservation request for the listing being accepted or rejected by the host computer associated with the listing.

21. The non-transitory computer readable medium of claim 16, further comprising:
  determining whether to display a listing to the guest computer based on the computed probability.

22. The non-transitory computer readable medium of claim 21, wherein determining whether to display the listing comprises comparing the computed probability with an acceptance threshold, and displaying the listing with the computed probability is equal to or above the acceptance threshold.

23. The non-transitory computer readable medium of claim 16, wherein the listing is for an accommodation being offered for reservation by a host computer, and the request feature is a gap feature indicating a specific period of time between a previous reservation or calendar unavailability of the accommodation ending and a reservation associated with a reservation request beginning.

24. The non-transitory computer readable medium of claim 16, wherein the steps further comprise filtering one or more listings from being presented, each of the one or more listings having a computed probability below a threshold value.

25. The non-transitory computer readable medium of claim 16, wherein the preference value specific to the listing for the request feature indicates a median or mean preference for the request feature across all reservation requests for the listing.

26. A computer system comprising:
  a processor; and
  a memory storing instructions that, when executed by the processor, cause the processor to perform steps, comprising:
    identifying, by a server at a first time, a plurality of listings for a plurality of host computers, the listings associated with accommodations for booking;
    accessing, by the server, a set of reservation requests received for the listings of the host computers, each reservation request for a listing having previously been accepted or rejected by the host computer associated with the listing;
    generating, by the server, a cluster feature vector for a request feature, the cluster feature vector identifying whether the reservation requests in the set of reservation requests possessed the request features;
    determining, by the server, a cluster preference numerical value for the request feature in the cluster feature vector based on (1) a number of the reservation requests in the set that were accepted and (2) a number of the reservation requests in the set that possess the request feature, wherein the request feature is a time period for reservation of the listing specified in the reservation request, the time period representing a date, a date range, or an amount of time from a date on which the reservation request was received;
    storing the cluster preference numerical value for the request feature;
    receiving, at a second time from a guest computer, a search query, the search query specifying the request feature;
    for each of the listings,
      determining, by the server, a listing-specific preference value for the request feature based on the cluster preference numerical value and a preference value specific to the listing for the request feature;
      generating, by the server, a preference model based on the listing-specific preference value, the preference model identifying a relationship between the request feature and a reservation request for the listing being accepted or rejected by the host computer associated with the listing;
      applying, by the server, the preference model to a prospective reservation request associated with the received search query for the listing to compute a probability that the prospective reservation request will be accepted by the host computer;

ranking, by the server, the listings based on the computed probabilities; and
presenting the listings to the guest computer based on the ranking.

27. The computer system of claim 26, wherein the request feature indicates a mechanism for classifying the set of reservation requests.

28. The computer system of claim 26, wherein determining the listing-specific preference value comprises:
   identifying a subset of the reservation requests that were received for the listing;
   determining a number of the subset that were accepted and a number of the subset that possess the request feature; and
   determining the listing-specific value based on a combination of the cluster preference value, the number of the subset that were accepted and the number of the subset that possess the request feature.

29. The computer system of claim 26, wherein generating the preference model comprises generating a training data set by applying the listing-specific value to a subset of the reservation requests that were received for the first listing.

30. The computer system of claim 26, wherein the steps further comprise processing the training data set using a logistic regression to determine the relationship between the request feature and a reservation request for the first listing being accepted or rejected by a first host computer associated with the first listing.

31. The computer system of claim 26, wherein the steps further comprise determining whether to display a listing to the guest computer based on the computed probability.

32. The computer system of claim 26, wherein determining whether to display the listing comprises comparing the computed probability with an acceptance threshold, and displaying the listing with the computed probability is equal to or above the acceptance threshold.

33. The computer system of claim 26, wherein a listing is for an accommodation being offered for reservation by a host computer, and the request feature is a gap feature indicating a specific period of time between a previous reservation or calendar unavailability of the accommodation ending and a reservation associated with a reservation request beginning.

34. The computer system of claim 26, wherein the steps further comprise:
   filtering one or more listings from being presented, each of the one or more listings having a computed probability below a threshold value.

35. The computer system of claim 26, wherein the preference value specific to the listing for the request feature indicates a median or mean preference for the request feature across all reservation requests for the listing.

* * * * *